(12) United States Patent
Shinpo et al.

(10) Patent No.: US 7,632,945 B2
(45) Date of Patent: Dec. 15, 2009

(54) CYANINE DYE

(75) Inventors: Akira Shinpo, Okayama (JP); Yoshimi Takahashi, Okayama (JP); Kentaro Yano, Okayama (JP); Yasushi Aizawa, Okayama (JP)

(73) Assignee: Kabushiki Kaisha Hayashibara Seibutsu Kagaku Kenkyujo, Okayama (JP)

( * ) Notice: Subject to any disclaimer, the term of this patent is extended or adjusted under 35 U.S.C. 154(b) by 465 days.

(21) Appl. No.: 10/565,592

(22) PCT Filed: Jul. 21, 2004

(86) PCT No.: PCT/JP2004/010334

§ 371 (c)(1),
(2), (4) Date: Jan. 23, 2006

(87) PCT Pub. No.: WO2005/007753

PCT Pub. Date: Jan. 27, 2005

(65) Prior Publication Data

US 2006/0189803 A1    Aug. 24, 2006

(30) Foreign Application Priority Data

Jul. 22, 2003    (JP) .............................. 2003-277736

(51) Int. Cl.
*C07F 1/08* (2006.01)
*C07D 213/89* (2006.01)
*C07F 15/00* (2006.01)

(52) U.S. Cl. .............................. 544/64; 546/6; 548/101; 548/402

(58) Field of Classification Search .................. 544/64; 546/6; 548/101, 402
See application file for complete search history.

(56) References Cited

FOREIGN PATENT DOCUMENTS

JP        10-310715 A    * 11/1998

OTHER PUBLICATIONS

Mushkalo et al. CAS Acession No. 1988:133386, 1988.*

* cited by examiner

*Primary Examiner*—Rei-Tsang Shiao
*Assistant Examiner*—Joseph R Kosack
(74) *Attorney, Agent, or Firm*—Browdy and Neimark, PLLC

(57) ABSTRACT

An objective of this invention is to extend the range of choosing organic dye compounds as light-absorbing agent in a variety of fields of, for example, information storage, information display, solar energy generation, electric machinery apparatus, electric communicating apparatus, optical apparatus, cloth, building/bedding/decorating product, sanitary and health goods, and agricultural material by providing an organic dye compound which is superior in light-absorbing property, light resistance, and solubility in the near-infrared region: The objective is attainable by providing a cyanine dye that bears within the same molecule a plurality of cyanine dye skeletons bound to a divalent group(s) and an organometallic complex as counter ion, as well as substantially absorbing a light with a wavelength longer than 700 nm.

2 Claims, 1 Drawing Sheet

CYANINE DYE

TECHNICAL FIELD

This invention relates to a novel cyanine dye which absorbs near infrared radiation.

BACKGROUND ART

In this age of the growing importance of information, there is a great urgent demand for organic dye compounds which absorb near infrared radiation. Their application is now extending beyond conventional field, for example, photo-detecting semiconductor device and filter material for use in plasma display; which solely utilize the near infrared radiation-shielding property of such an organic dye compound, towards the field of information storage such as optical recording medium using laser as light source, optical card, printing plate, thermocopy and thermal recording which utilize an energy converted from near infrared radiation by such an organic dye compound.

The properties required for organic dye compounds to be subjected to such a use are to be appropriate with respect to optical absorption characteristic and large with respect to optical resistance against ambient light such as natural or artificial light in the near infrared region and also with respect to solubility in solvents. Typical organic dye compounds as proposed heretofore are, for example, anthraquinone, phthalocyanine and cyanine dyes (see, for example, Japanese Patent Kokai Nos. 116611/99, 202592/02 and 167343/03): Among these, anthraquinone dye has been deemed to be advantageous with respect to optical resistance but disadvantageous with respect to optical absorption characteristic, while phthalocyanine dye, advantageous with respect to both optical absorption characteristic and optical resistance but disadvantageous with respect to solubility in solvents. Although cyanine dye is advantageous in both optical absorption characteristic and solubility, conventional cyanine dye has the demerit that it is poorer with respect to optical resistance.

In view of such situation, the objective of this invention is to provide an organic dye compound which is superior in optical absorption characteristic and optical resistance in the near infrared region and also in solubility so as to extend the range of choosing organic dye compounds as light absorbing organic material in the fields as described above.

DISCLOSURE OF INVENTION

The present inventors extensively studied and screened cyanine dyes, a type of dye which had been deemed to be inferior in optical resistance, leading to a cyanine dye which bears within the same molecule a plurality of cyanine dye skeletons coupled each other via a divalent group and also an organometallic complex as counter ion, as well as substantially absorbing light at a wavelength longer than 700 nm. Also was found that since such cyanine dye absorbs light at a wavelength longer than 700 nm, in particular, near infrared radiation and exhibits an elevated optical resistance against ambient light such as natural or artificial light in the near infrared region and also a remarkable solubility in various organic solvents with no practical obstacles, it is advantageously feasible as organic material directed to absorb near infrared radiation so as to shield it or to convert it into energy in a variety of fields which need organic dye compounds with such a property.

Thus, this invention attains the above described objective by providing a cyanine dye which bears within the same molecule a plurality of cyanine dye skeletons coupled each other via a divalent group and also an organometallic complex as counter ion, as well as substantially absorbing light at a wavelength longer than 700 nm.

PREFERRED EMBODIMENT FOR CARRYING OUT THE INVENTION

Figure 1:
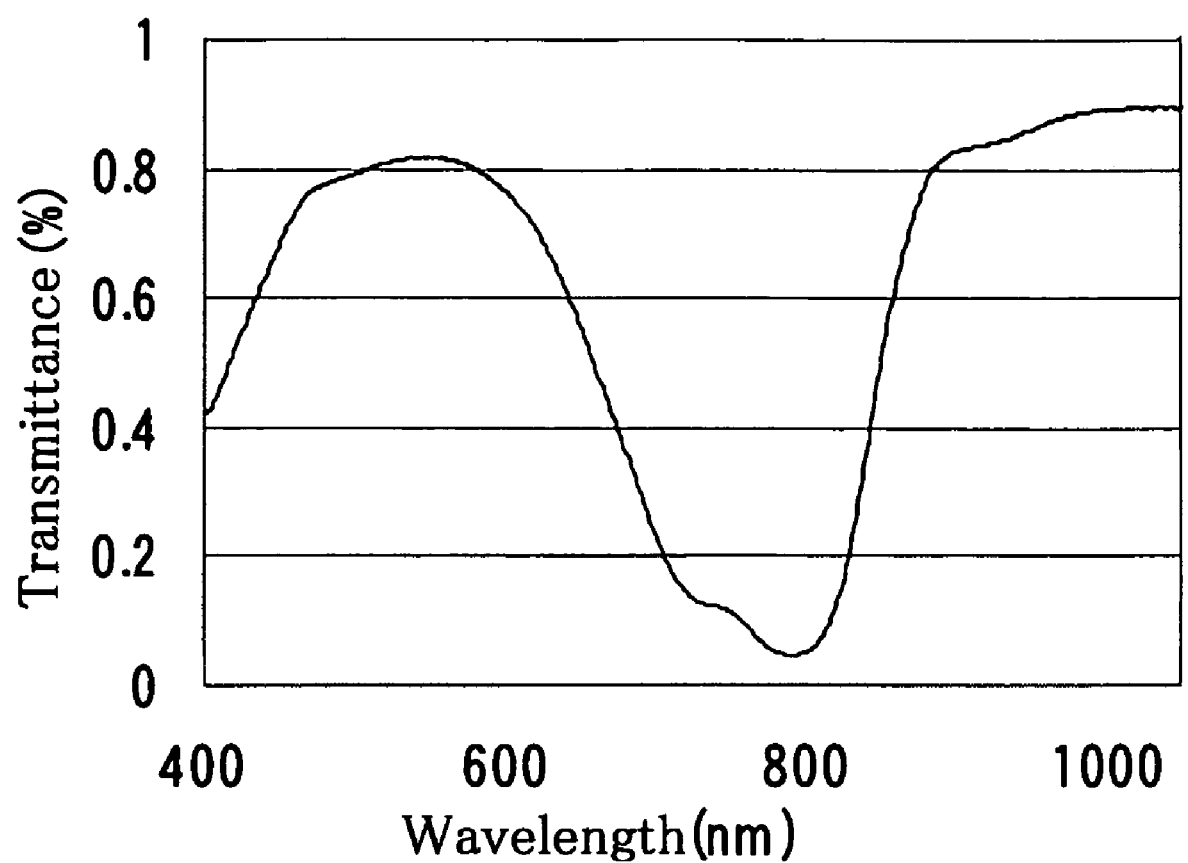
FIG. 1 is an optical transmittance spectrum of a cyanine dye according to this invention when prepared into a thin membrane form.

As described heretofore, this invention relates to a cyanine dye which bears within the same molecule a plurality of cyanine dye skeletons coupled each other via a divalent group and also an organometallic complex as counter ion, as well as substantially absorbing light at a wavelength longer than 700 nm.

As well known, the term "cyanine dye skeleton" means a type of skeleton in organic dye compounds with an atomic group represented by General Formula 1, where each nitrogen atom located at respective ends of polymethine chain is provided as constitutive atom in heterocycles $Z^1$ and $Z^2$ which are the same or different each other (see, for example, "Encyclopedic Dictionary of Chemistry", pp. 914 to 915, edited by Michinori Oki et al., published by TOKYO KAGAKU DOZIN CO.; LTD; the 20 Oct. 1989).

General Formula 1:

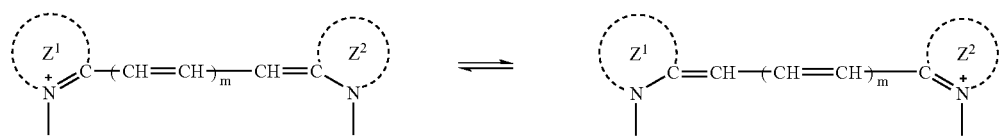

In this invention, the symbol "m" in General Formula 1 represents an integer of 2 or larger: In usual case, "3" is most desirable with respect to optical absorption characteristic at a wavelength longer than 700 nm, in particular, in the near infrared region. Thus, in the cyanine dye according to this invention, at least one cyanine dye skeleton is preferably to be heptamethine cyanine dye skeleton whose "m" is 3.

The term "organometallic complex" as referred to as in this invention means a monovalent or polyvalent anion of organometallic complex bearing a metallic atom as center atom, which forms within the molecule of cyanine dye according to this invention an ionic bond together with either cationic cyanine dye skeleton. As to such an organometallic complex, there are feasible, for example, those of azo, thiocatechol chelate, thiobisphenolate chelate, bisdithiol-α-diketone and bisphenyldithiol types which comprise as center atom a transition element of the groups 3 to 11 in the periodic table, such as scandium, yttrium, titanium, zirconium, hafnium, vanadium, niobium, tantalum, chromium, molybdenum, tungsten, manganese, technetium, rhenium, iron, ruthenium, osmium, cobalt, rhodium, iridium, nickel, palladium, platinum, copper, silver, gold, cadmium and mercury. Dependently upon the application fields of cyanine dye, the more preferable is an organometallic complex which comprises cobalt, nickel or copper gatom as center atom in view of production cost and handleability, while in case that cyanine dye is used in products which may come into contact directly with living bodies, it is desirable in view of safeness to use an organometallic complex which comprises copper atom as center atom.

The term "divalent group" as referred to as in this invention means a substituent which bears a pair of sites capable of coupling cyanine dye skeletons as described above. Particular divalent groups are, for example, aliphatic hydrocarbon groups such as methylene, ethylene, vinylene, trimethylene, propylene, propynylene, tetramethylene, pentamethylene and hexamethylene groups; alicyclic hydrocarbon groups such as cyclopentylene, cyclohexenylene and cyclohexadienylene groups; aromatic hydrocarbon groups such as o-phenylene, m-phenylene, p-phenylene and naphthylene groups; oxygen-containing characteristic groups such as oxy and carbonyl groups; ether groups such as methyleneoxy and ethyleneoxy groups; acyl groups such as oxalyl, malonyl, succinyl, glutaryl, adipoyl, suberoyl, o-phthaloyl, m-phthaloyl and p-phthaloyl groups; sulfer-containing characteristic groups such as thio and thiocarbonyl groups; nitrogen-containing characteristic groups such as imino and azo groups; and combinations thereof. Among these, with respect to easiness in synthesis and solubility in organic solvents of the cyanine dye, the more preferable is those whose chain length is 10 or less, in particular, 3 to 8 in terms of the number of constitutive atoms such as carbon atom. In such a divalent group, one or more hydrogen atoms may be substituted with, for example, amino, carboxy, cyano, nitro, halogen and hydroxyl groups, as long as such substitution does not depart from the objective of this invention.

As to the sites in cyanine dye skeleton to which such a divalent group is bound to couple cyanine dye skeletons, there is no restriction, as long as it does not substantially alter the optical absorption characteristic and solubility inherent to cyanine dye skeletons. With a viewpoint of easiness in synthesis, the more preferable is a cyanine dye where either binding site of divalent group is bound to the nitrogen atom in General Formula 1. Examples of such a cyanine dye are those which bear within the same molecule an atomic group represented by General Formula 2 or 3.

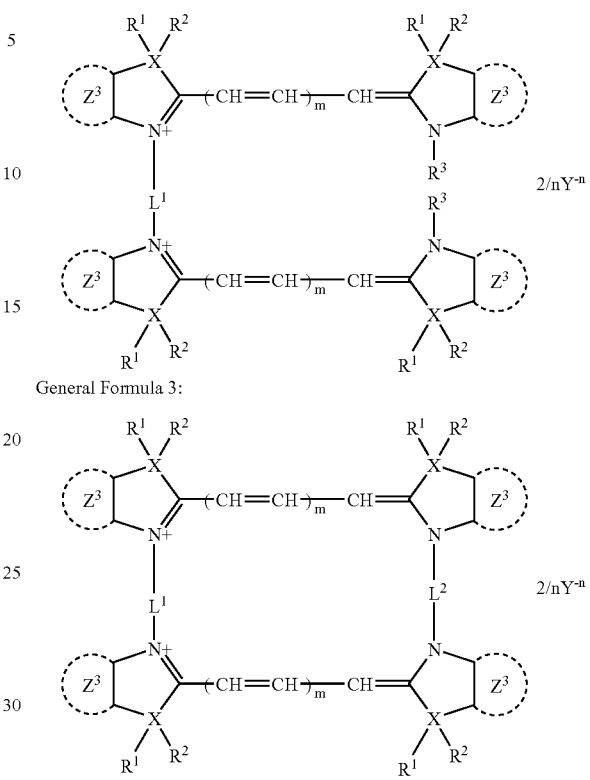

General Formula 2:

General Formula 3:

In General Formulae 2 and 3, X denotes a carbon atom or heteroatom of the group 15 or 16 in the periodic table, such as nitrogen, oxygen, sulfur, selenium and tellurium atoms. Among these, with respect to easiness in synthesis and handleability, X is preferably to be carbon, nitrogen, oxygen or sulfur atom. $Z^3$ denotes either benzene or naphthalene ring, while $R^1$ to $R^3$ independently denote a hydrogen atom or aliphatic hydrocarbon group such as methyl, ethyl, propyl, isopropyl, butyl, isobutyl, sec-butyl, tert-butyl, pentyl, isopentyl, neopentyl and tert-pentyl groups: In case that X is a heteroatom, then $R^1$ and/or $R^2$ are not present. $L^1$ and $L^2$ denote the same or different divalent groups as described heretofore; the symbol "m", an integer of 2 or larger; Y, a monovalent or multivalent anion of organometallic complex as described above; and the symbol "n", the number of charge unit in the anion of organometallic complex. In a cyanine dye which bears within the same molecule an atomic group represented by General Formula 2 or 3, the "polymethine chain" in cyanine dye skeleton may bear a substituent and/or cyclic structure.

Substituents in polymethine chain are, for example, aliphatic hydrocarbon groups such as methyl, ethyl, propyl, isopropyl, isopropenyl, 1-propenyl, 2-propenyl, 2-propynyl, butyl, isobutyl, sec-butyl, tert-butyl, 2-butenyl, 1,3-butadienyl, pentyl, 2-pentenyl and 2-penten-4-ynyl groups; alicyclic hydrocarbon groups such as cyclopropyl, cyclobutyl, cyclopentyl, cyclopentenyl, cyclohexyl and cyclohexenyl groups; aromatic hydrocarbon groups such as phenyl and naphthyl groups; halogen groups such as fluoro, chloro, bromo and iodo groups; amino groups such as dimethylamino, diethylamino, dipropylamino, diisopropylamino, dipentylamino, dicyclohexylamino and N,N-diphenylamino groups; heterocyclic groups such as piperidino and morpholino groups; and combinations thereof. Cyclic structures in polymethine chain are those which bear at least one unsaturated bond, for example, ethylenic double bond located in such a manner that it behaves as a part of polymethine chain and gives an electronic reasonance over the polymethine chain, for example, cyclopentene, cyclopentadiene, cyclohexene, cyclohexadiene, cycloheptene, cyclooctene, cyclooctadiene and benzene: Each of these may has a substituent similar to those in polymethine chain as described above. As to other sites in cyanine dye skeletons to which a divalent group may be bound to couple a plurality of cyanine dye skeletons, there are feasible, for example, the meso position in polymethine chain and benzene and naphthalene ring of $Z^3$ in General Formulae 2 and 3.

Chemical Formulae 1 to 23 are illustrative for the cyanine dye according to this invention. Since these absorb light at a wavelength longer than 700 nm and usually exhibit an absorption maximum at a wavelength around 800 nm in the near infrared region with an extremely large molecular absorption coefficient ($1 \times 10^5$ or larger, usually, $2 \times 10^5$) at the absorption maximum wavelength (molecular absorption coefficient at the absorption maximum wavelength may be abbreviated as "$\epsilon$" hereinafter), they efficiently absorb near infrared radiation.

Chemical Formula 1:

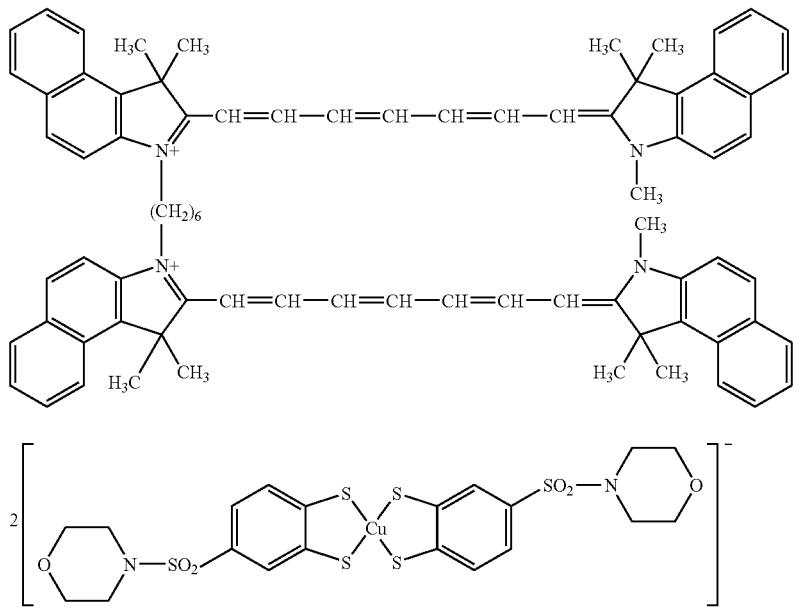

Chemical Formula 2:

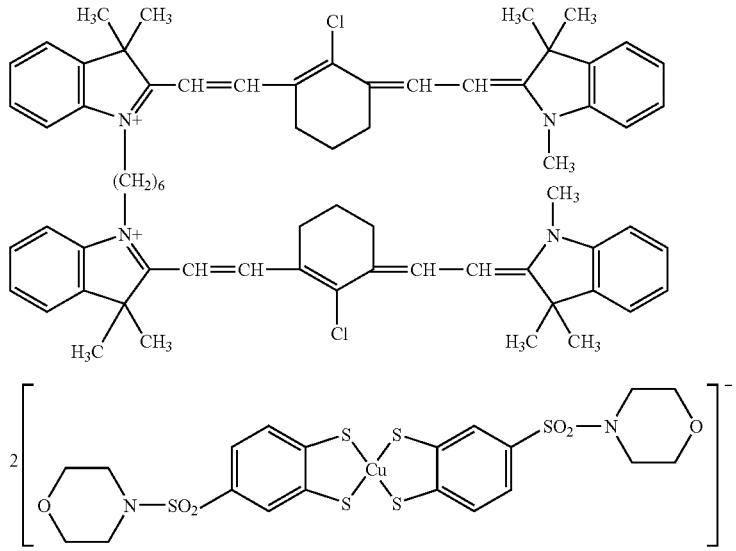

Chemical Formula 3:
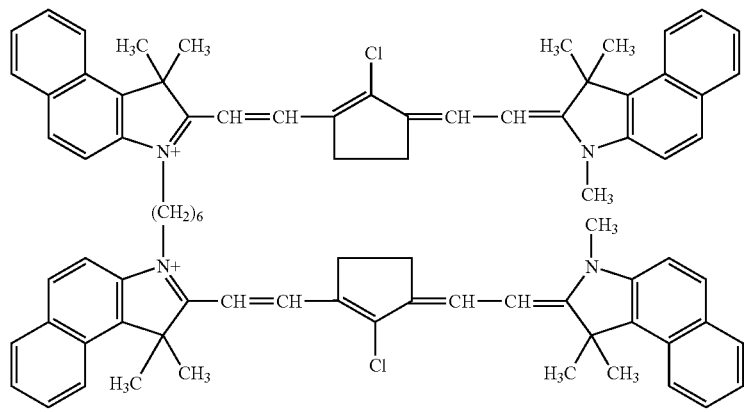
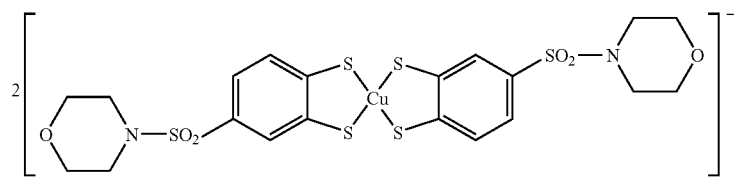
Chemical Formula 4:
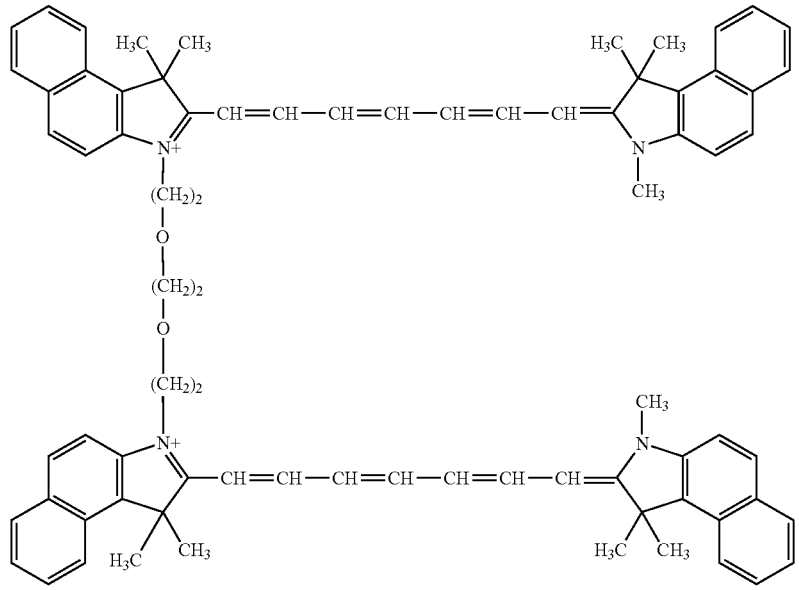
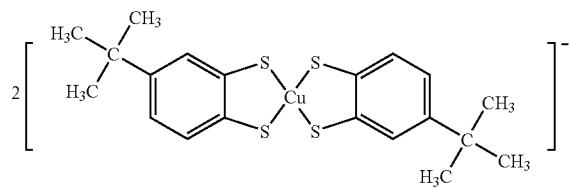

Chemical Formula 5:
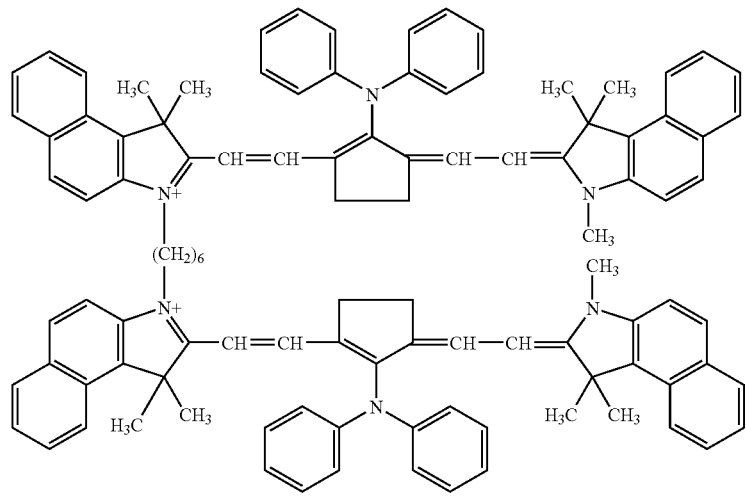
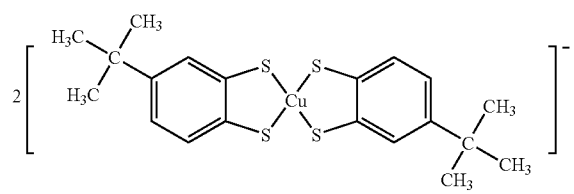
Chemical Formula 6:
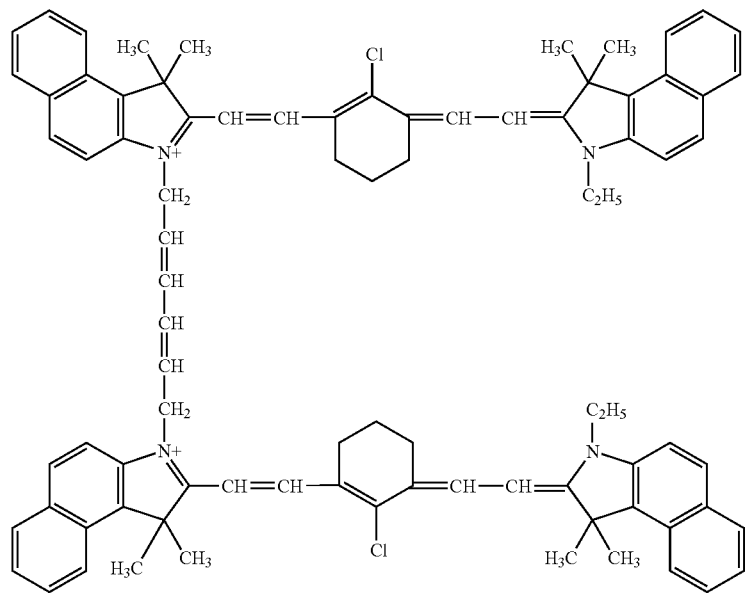
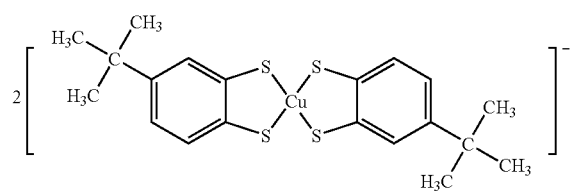

Chemical Formula 7:
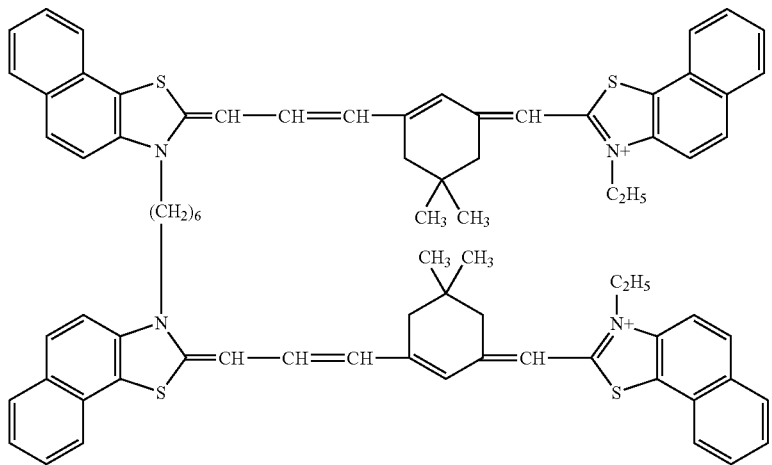
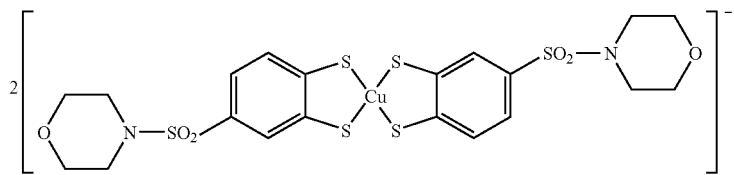
Chemical Formula 8:
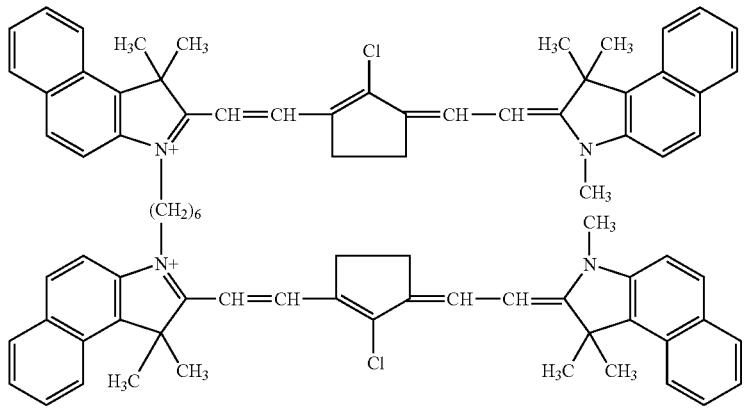
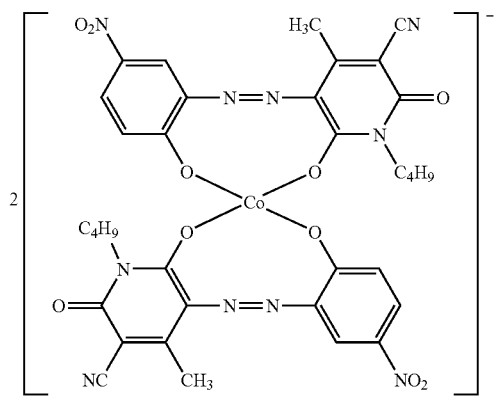

Chemical Formula 9:
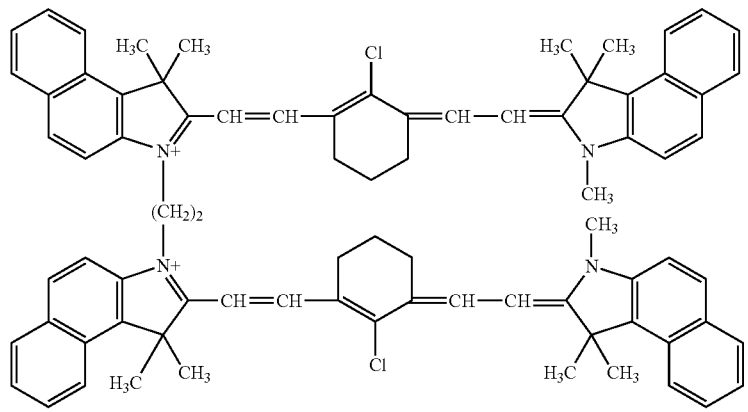
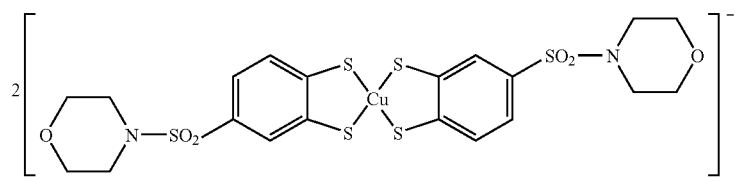
Chemical Formula 10:
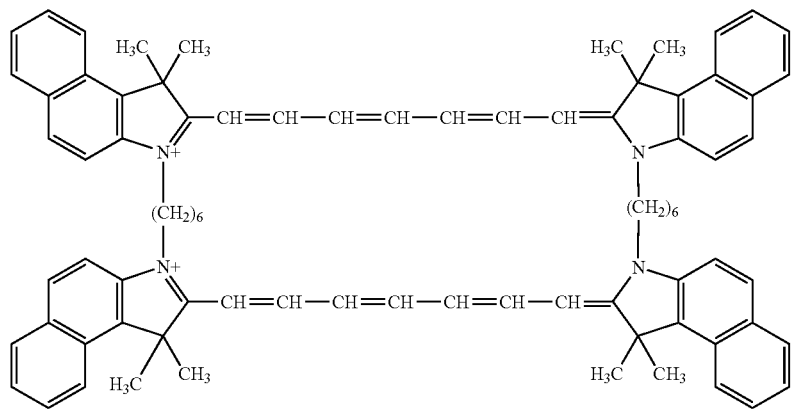
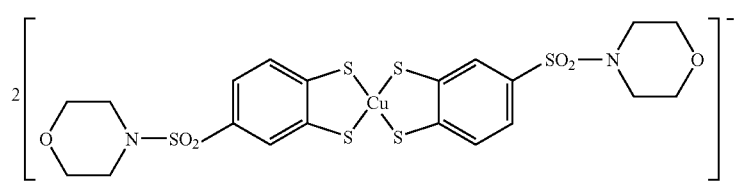

-continued
Chemical Formula 11:
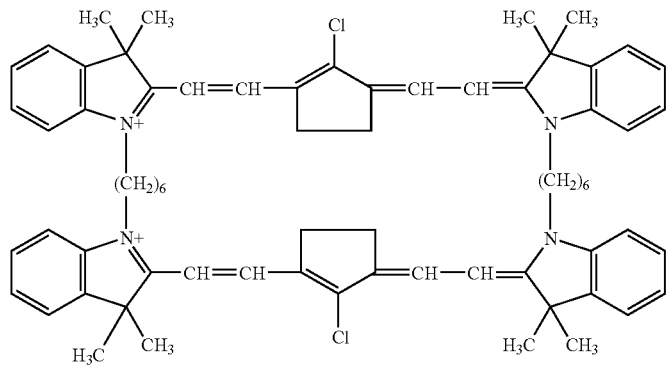
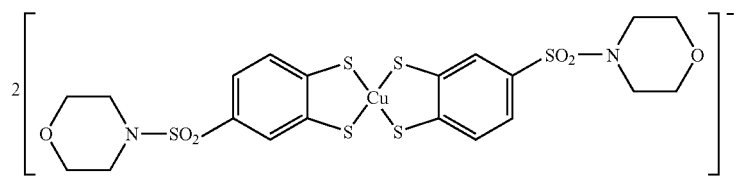
Chemical Formula 12:
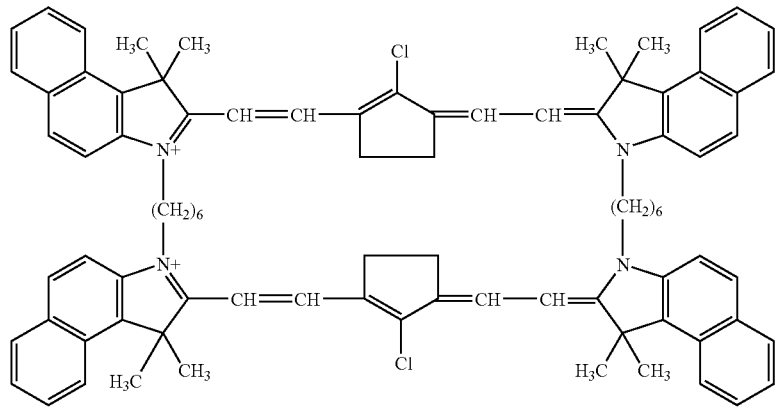
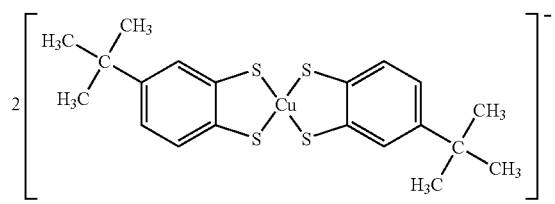

-continued
Chemical Formula 13:
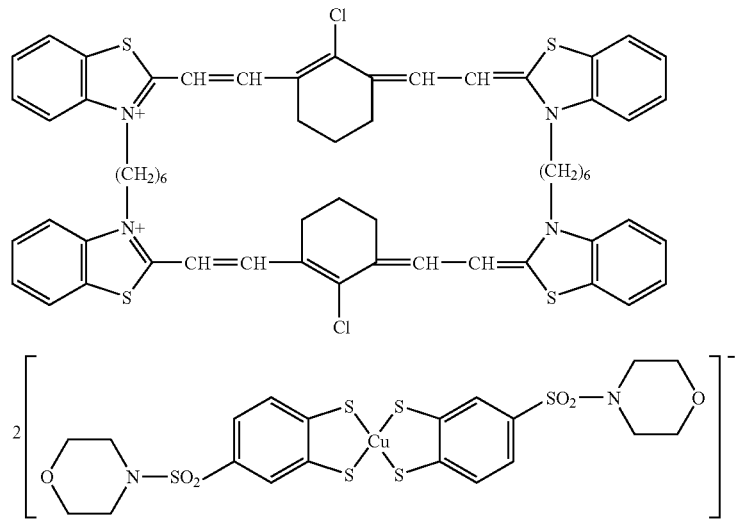
Chemical Formula 14:
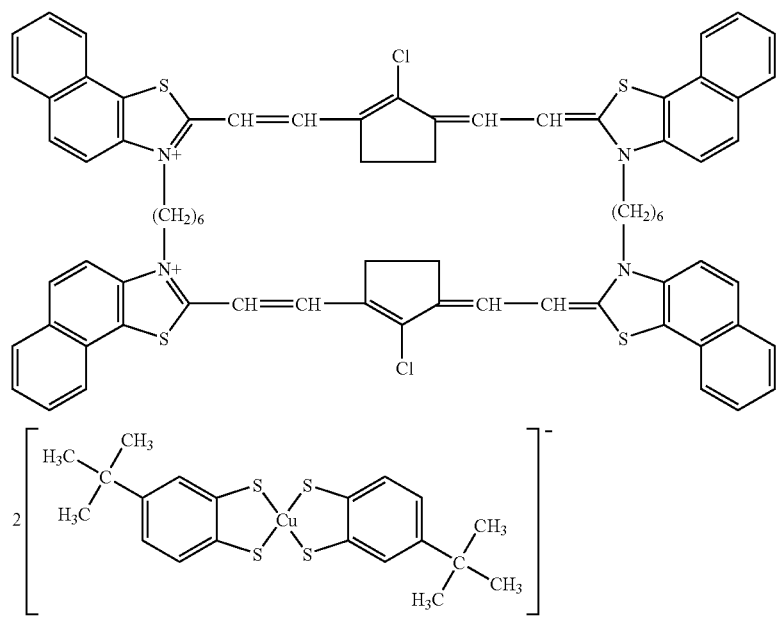
Chemical Formula 15:
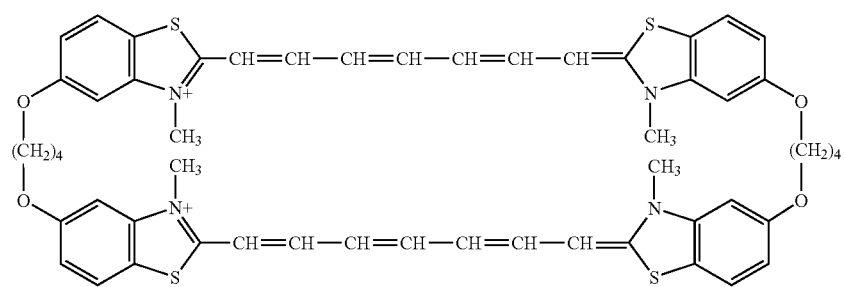

-continued
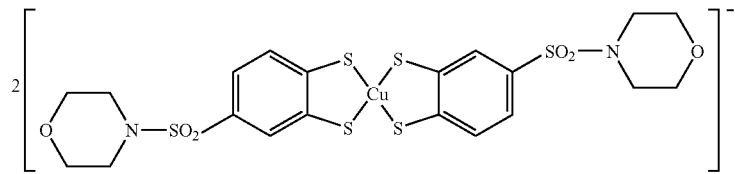
Chemical Formula 16:
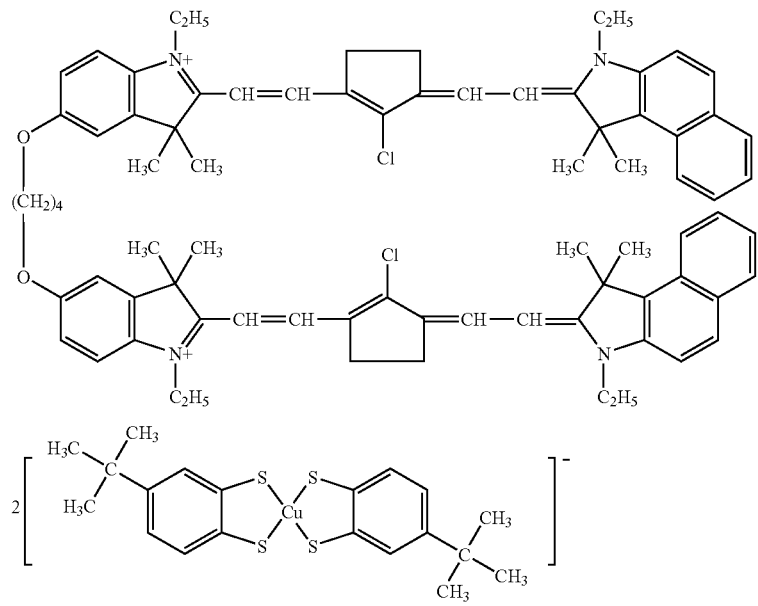
Chemical Formula 17:
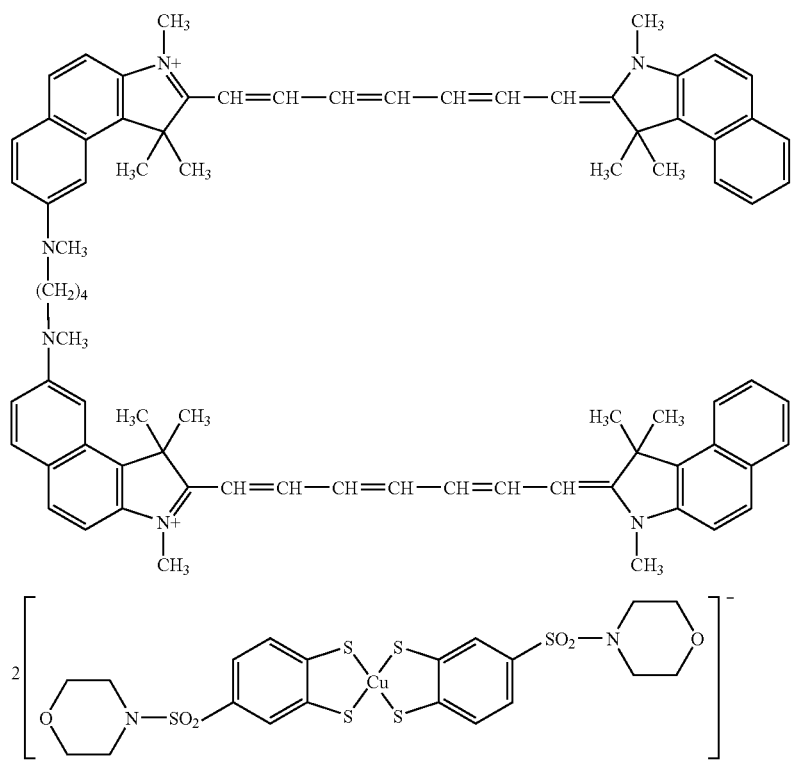

-continued
Chemical Formula 18:
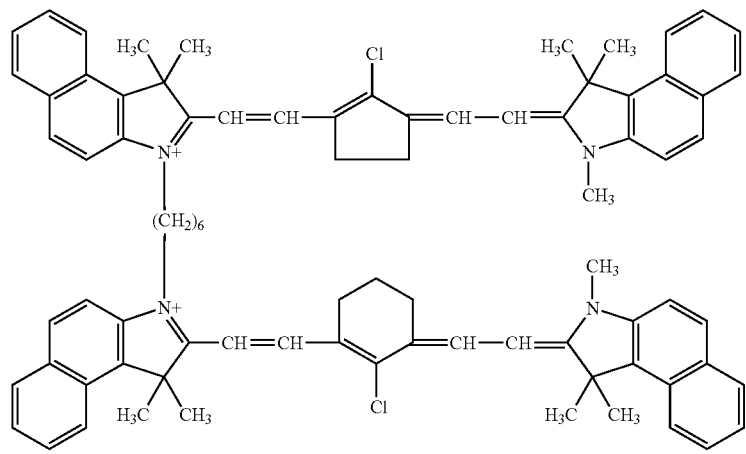
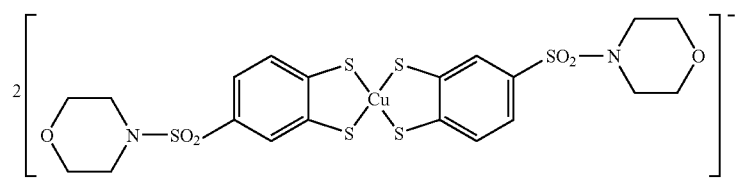
Chemical Formula 19:
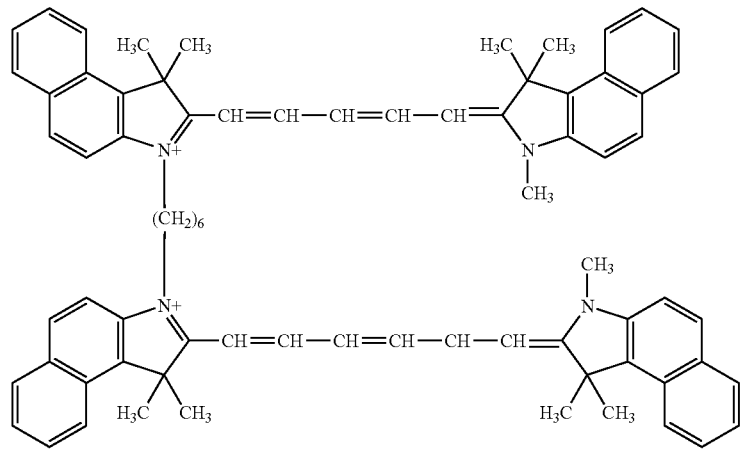
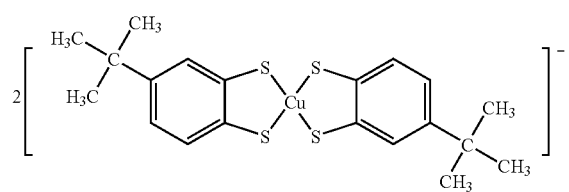

-continued
Chemical Formula 20:
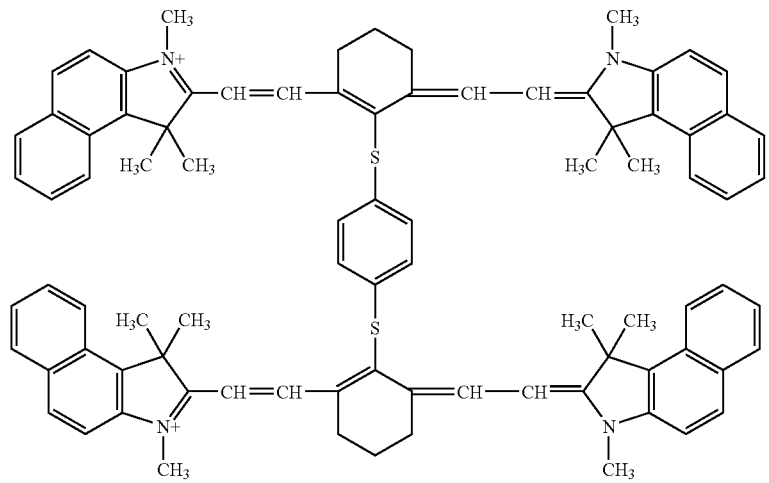
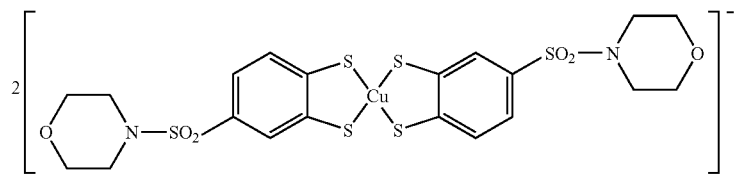
Chemical Formula 21:
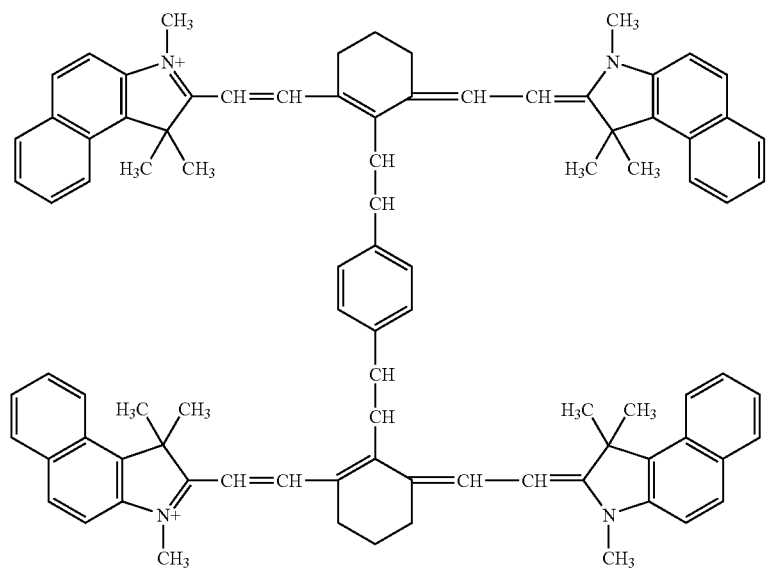

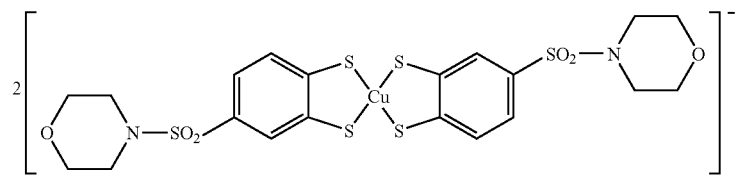
Chemical Formula 22:
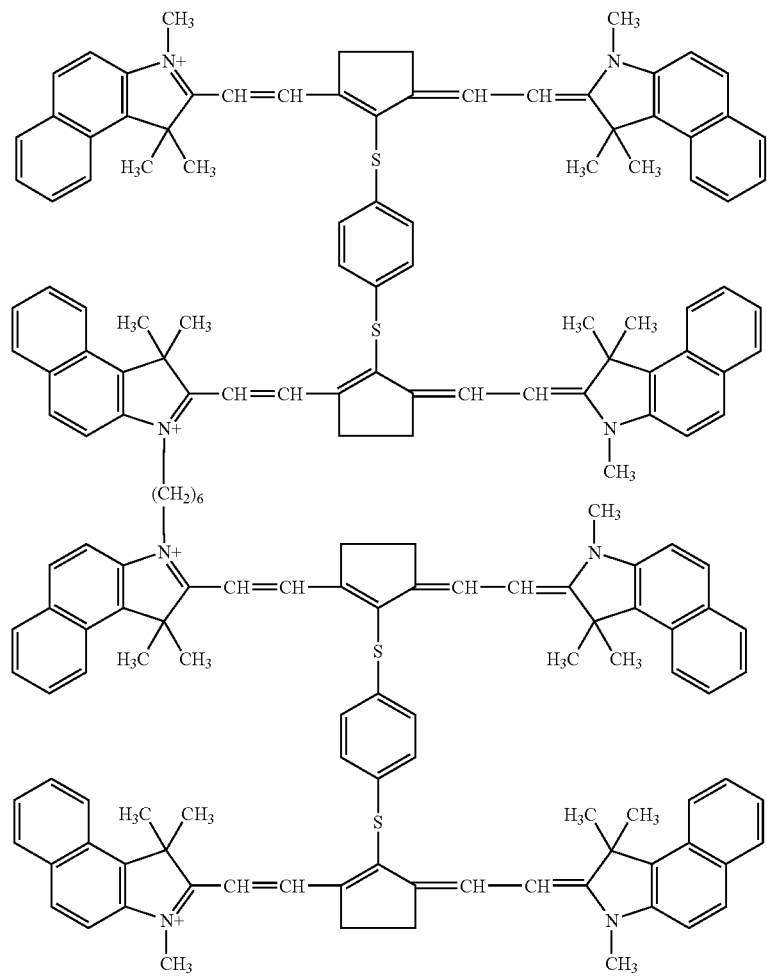
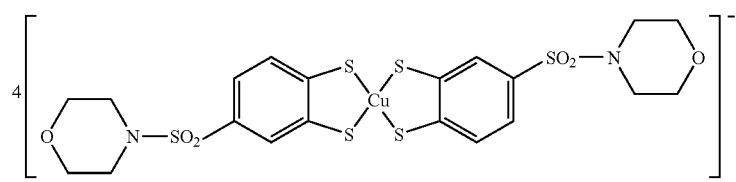

Chemical Formula 23:

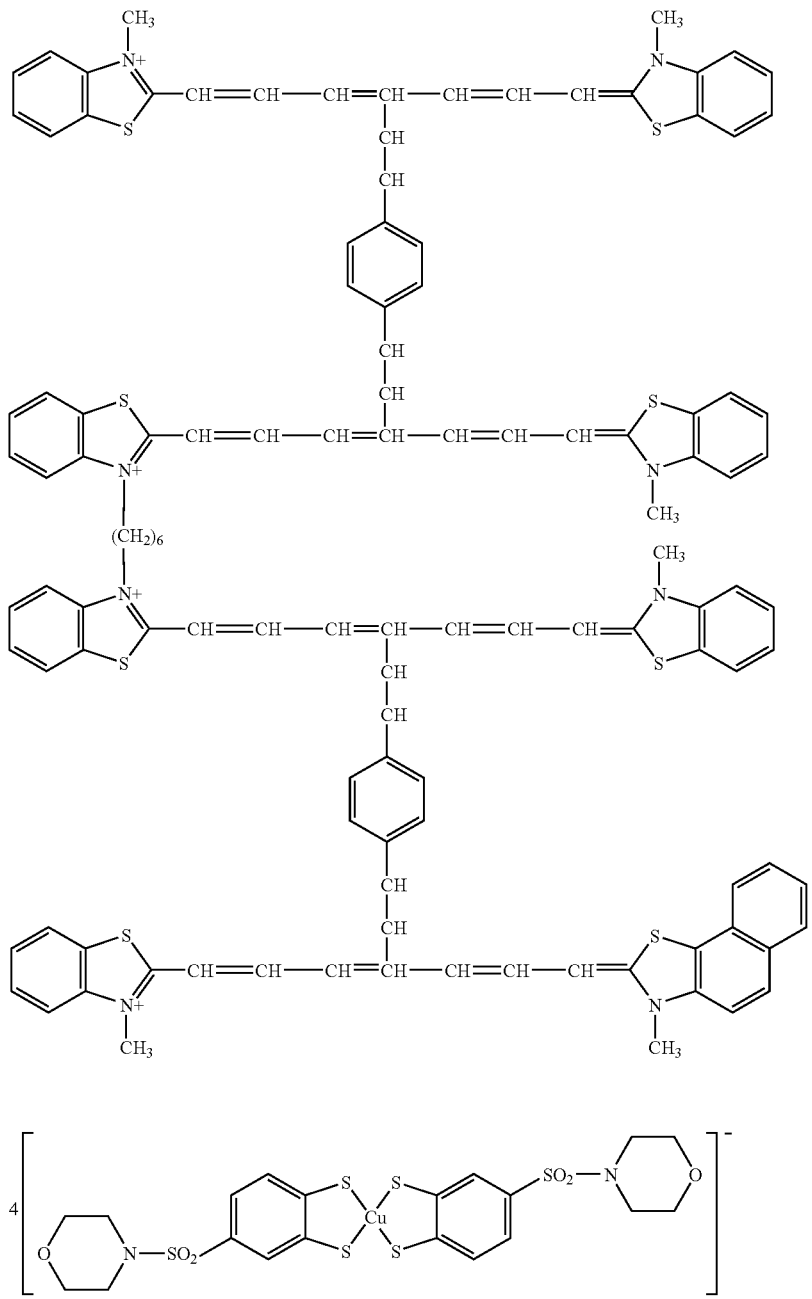

The cyanine dye of this invention can be synthesized in various manners: With an economical viewpoint, it is preferable to employ a process utilizing the nucleophilic substitution reaction between an active methylene group and an appropriate leaving group. In case of synthesizing a cyanine dye with an atomic group represented by General Formula 2 or 3 in accordance with this process, the objective cyanine dye can be obtained in a desired amount by, for example, allowing a chemical compound with an atomic group represented by General Formula 4, which bears $Z^3$ and $R^1$ and $R^2$ correspondingly with General Formula 2 or 3, to react with another chemical compound with an atomic group represented by General Formula 5, which bears $Z^3$ and $R^1$ to $R^3$ correspondingly with General Formula 2 or 3; and alternatively allowing a chemical compound with an atomic group represented by General Formula 4 to react with another chemical compound represented by General Formula 6 which gives a polymethine chain correspondingly with General Formula 2 or 3. The symbol "M" in General Formula 5 denotes, for example, an appropriate leaving group such as phenylamino group, while the symbol "n", an integer equal to m−1 ("m" is defined in General Formulae 2 and 3).

General Formula 4:

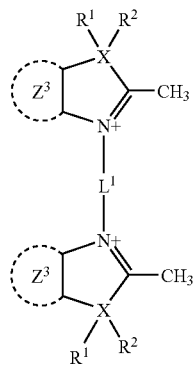

General Formula 5:

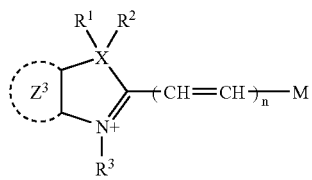

General Formula 6:

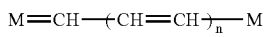

In such a synthesis, adequate amounts of a compound with an atomic group represented by General Formula 4 and another compound with an atomic group represented by General Formula 5 or 6 are placed in a reaction vessel, dissolved in an appropriate solvent, if necessary, admixed with, for example, either of basic compounds such as sodium hydroxide, potassium hydroxide, sodium carbonate, potassium carbonate, sodium hydrogencarbonate, potassium hydrogencarbonate, ammonia, triethylamine, piperidine, pyridine, pyrrolidine, aniline, N,N-dimethylaniline and N,N-diethylaniline, acidic compounds such as hydrochloric acid, sulfuric acid, nitric acid, acetic acid, trifluoroacetic acid, p-toluenesulfonic acid, methanesulfonic acid and trifluromethanesufonic acid and Lewis acidic compounds such as aluminium chloride, zinc chloride, tin chloride and titanium tetrachloride, and allowed to react at ambient or higher temperature while heating and stirring such as refluxing.

As to solvents, there are feasible hydrocarbons such as pentane, hexane, cyclohexane, octane, benzene, toluene and xylene; halides such as carbon tetrachloride, chloroform, 1,2-dichlorobenzene, 1,2-dibromobenzene, trichloroethylene, tetrachloroethylene, chlorobenzene, bromobenzene and α-dichlorobenzene; alcohols and phenols such as methanol, ethanol, 1-propanol, 2-propanol, 1-butanol, 2-butanol, isobutyl alcohol, isopentyl alcohol, cyclohexanol, ethylene glycol, propylene glycol, 2-methoxyethanol, 2-ethoxyethanol, phenol, benzyl alcohol, cresole, diethylene glycol, triethylene glycol and glycerin; ethers such as diethyl ether, diisopropyl ether, tetrahydrofuran, tetrahydropyran, 1,4-dioxane, anisole, 1,2-dimethoxyethane, diethylene glycol dimethyl ether, and dicyclohexyl-18-crown-6; acids and acid derivatives such as acetic acid, acetic anhydride, trichloroacetic acid, trifluoroacetic acid, propionic anhydride, ethyl acetate, butyl carbonate, ethylene carbonate, propylene carbonate, formamide, N-methylformamide, N,N-dimethylformamide, N-methylacetoamide, N,N-dimethylacetoamide, and hexamethylphosphoric triamide; nitriles such as acetonitrile, propionitrile, succinonitrile and benzonitrile; nitro compounds such as nitromethane and nitrobenzene; sulfur-containing compounds such as dimethylsulfoxide and sufolane; and water, which may be used in combination, if necessary.

In case of using solvents, generally, a larger amount of solvent leads to a less reaction efficiency, while a less amount of solvent, a more difficulty in homogenous heating and stirring and also in a more liability to side reactions. Thus, it is desirable to set the amount of solvent to a level of 100-folds or less, usually, 5 to 50-folds by weight of the total amount of starting compounds to be used. The reaction completes within 10 hours, usually, 0.5 to 5 hours, dependently upon the type of starting compounds and reaction conditions. The progress of reaction can be monitored by conventional method, for example, thin layer chromatography, gas chromatography and high-performance liquid chromatography. The cyanine dye of this invention can be obtained in a desired amount by or in accordance with such a process. Each compound represented by General Formulae 4 to 6 can be obtained by usual method in this art: In case that such compounds are commercially available, one may purify them prior to use, if necessary. Dependently upon the types of starting compounds and reaction conditions, in case that a cyanine dye bearing a counter ion other than an anion of organometallic complex is formed, it is then subjected to usual ion exchange reaction, thus obtaining a cyanine dye according this invention which comprises a prescribed organometallic complex as counter ion.

Prior to uses, the cyanine dye thus obtained is usually purified with a method which is usually employed in the purification of analogous compounds, such as dissolution, extraction, separation, decantation, filtration, concentration, thin layer chromatography, column chromatography, gas chromatography, high-performance liquid chromatography, distillation, sublimation and crystallization: These methods may be applied in combination, if necessary. Dependently upon the type and application field of cyanine dye, it is desirable to highly purify it by means of, for example, distillation, crystallization and/or sublimation, prior to its use.

Since as described heretofore, the cyanine dye of this invention substantially absorbs light at a wavelength longer than 700 nm and usually exhibits an absorption maximum around 800 nm in the near infrared region with an elevated molecular absorption coefficient at the absorption maximum wavelength, it efficiently absorbs near infrared radiation. Further, the cyanine dye of this invention exhibits a larger optical resistance against ambient light such as artificial or natural light in the near infrared region than conventional analogous compound, as well as exhibiting a remarkable solubility with no practical obstacles in organic solvents, for example, amides, alcohols, ketones, ethers, esters, hydrocarbons, nitrites and halides which are usually used in the field of, for example, information storage, information display and solar power generation. Because of these features, the cyanine dye of this invention is very useful as light absorbing organic material to absorb near infrared radiation so as to shield it or to convert it into energy in a variety of fields of, for example, information storage, information display, solar power generation, electric machinery apparatus, electric communication apparatus, optical apparatus, cloth, building/bedding/decorating product, sanitary and health product and agricultural material.

In the field of information storage, the cyanine dye of this invention is useful as sensitizer and opto-thermal converting agent which are directed to absorb near infrared radiation so as to accelerate or induce the polymerization or sensitization of polymerizable compounds or polymerization initiators in printing plate and thermal copy and thermal recording. Further in the field of information storage, the cyanine dye of this invention is useful as recording layer material in optical recording media such as CD-R using as light source a laser with a wavelength around 780 nm to write in and read out information, as well as light shielding or heat-insulating agent which is to suppress thermal radiation to reach the recording layer in optical recording medium so that reading out of recorded information is not hindered or erased in, for example, DVD-R and Blu-ray Disc using as light source a laser with a shorter wavelength. As to additional uses as sensitizer, for example, in the field of solar power generation, in case that the cyanine dye of this invention is engaged on the surface of semiconductor electrodes in dye-sensitized solar cells, the sensitivity of semiconductor electrodes against near infrared radiation becomes larger to remarkably improve their opto-electric conversion efficiency. Since the cyanine dye of this invention is large in optical resistance, solar cells using the cyanine dye of this invention as photosensitizer have a practical merit that they have a less liability to electromotive force decay caused by photosensitizer when used over an extended time period.

In the field of information display, since the cyanine dye of this invention is satisfiable with respect to optical absorption characteristic and optical resistance in the near infrared region, it is very useful as near infrared absorbent in front members which are equipped to the displays of television sets. As well known, upon the starting of high definition television broadcast, television sets of plasma display type are now in a rapid and great demand: Plasma display has the demerit that it is in principle inevitable from near infrared radiation which may come in red color emission to hinder a pure and vivid red color picture and also arise a malfunction in infrared remote controller and cordless phone. Although there have been proposed several ways to solve these problems where the display units of plasma display are equipped with front members using near infrared absorbents which comprise a variety of organic dye compounds such as anthraquinone dye, many of those have the demerit that they are insufficient with respect to optical resistance, thus front members are liable to loose radiation shielding ability when used over an extended time period. Since the cyanine dye of this invention selectively and consistently shields near infrared radiation from information displaying equipments when applied as near infrared absorbent to front members to be equipped to such an information displaying equipment, thus obtaining over an extended time period a high definition picture superior in contrast and color reproducibility without arising malfunction of infrared remote controller and cordless phone by near infrared radiation. As to information displaying equipments to which the cyanine dye of this invention is applicable, there are feasible, for example, television sets of direct view type using cathode-ray tube, plasma displays, panel television sets of panel type using electroluminescent displays, television sets of non luminescent type using liquid crystal displays and television sets of rear projection type installed with liquid crystal projectors.

In the field of electric communication apparatus, electric machinery apparatus and optical apparatus, the cyanine dye of this invention has practical merits that it reduces noises from near infrared radiation and the elevation of ambient temperature by heat radiation, as well as that it adjusts visual sensitivity to give a desired level when applied as filter material to, for example, image pick-up tube, photo-detecting semiconductor device and optical fiber. As to additional uses as filter material, in the field of agricultural material, it is feasible to control the wavelength distribution of light coming to useful plants such as ornamental and edible plants so as to regulate their growth when applied to, for example, glass or plastic material in plate, sheet or film form in greenhouse.

In addition to uses as described above, in the case of using the cyanine dye of this invention as light shielding agent, heat shielding agent, heat insulating agent or heat accumulating agent, if necessary, in combination with one or more other materials capable of absorbing light in the ultraviolet, visible and/or infrared region in clothes in general, in particular, those with heat insulating and heat accumulating fiber or those with fibers which exhibit a camouflaging ability against infrared reconnaissance, as well as in other products, for example, building/bedding/decorating products such as a drape, lace, casement, print, venetian blind, roller blind, shutter, shop curtain, blanket, "futon (a set of Japanese mattress and quilts placed on the tatami floor for use as a bed)", "futon-ji (cloth for use in futon)", cover for "futon", bed sheet, "zabuton (a Japanese cushion)", pillow, pillow cover, cushion, mat, carpet and sleeping bag, interior and exterior materials for use in windowpane, building, car, automobile, train, ship and airplane, wind glasses, sanitary and health products such as paper diaper, diaper cover, eyeglasses, monocle and lorgnette, shoe insoles, shoe internal base sheets, materials for use in bags, "furoshiki (Japanese wrapping cloth)", materials for umbrellas, parasols, stuffed toys, lighting apparatuses, sunglasses, sun visors, sunroofs, windows of oven and microwave oven, and wrapping materials, bottles and containers for use to wrap, such a product, the dye has practical merits that it prevents or reduces in living bodies and products their damage and trouble such as undesirable temperature variation and eye strain, decay of visual cells and cataract where near infrared radiation is one of their causes, as well as that it adjusts chromaticity, color, color tone, touch and appearance of such a product and also a reflected or transmitted light from such a product to a desired color balance. Like conventional organic compound which absorbs near infrared radiation, the cyanine dye of this invention is useful in inalterable ink, inalterable and falsifiable bar code ink, near infrared radiation absorbing ink, near infrared absorbing paint, marking agent to position photographs and films, classifying dye for use in recycling plastics and preheating auxiliary for use in processing and molding PET bottles, as well as effective ingredient in pharmaceuticals directed to treat thermosensitive tumors in general.

Several embodiments according to this invention will be explained with reference to the following Examples.

EXAMPLE 1

Cyanine Dye

Ten milliliters of methanol was placed in a reaction vessel, admixed with 2.0 g of the compound represented by Chemical Formula 24, 1.5 g of the compound represented by Chemical Formula 25 and 5 ml each of acetic anhydride and triethylamine, and allowed to react while stirring and heating at 65 to 70° C. for 30 minutes. The reaction mixture was cooled, and the resultant crystals were recrystallized in acetone, thus obtaining 0.95 g of the compound represented by Chemical Formula 26 in a purple crystal form.

Chemical Formula 24:

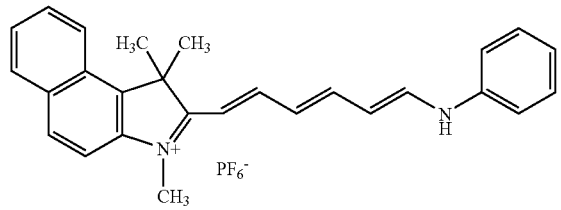

Chemical Formula 25:

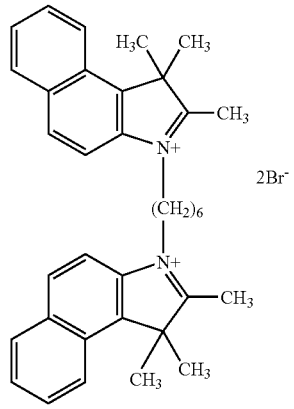

Chemical Formula 26:

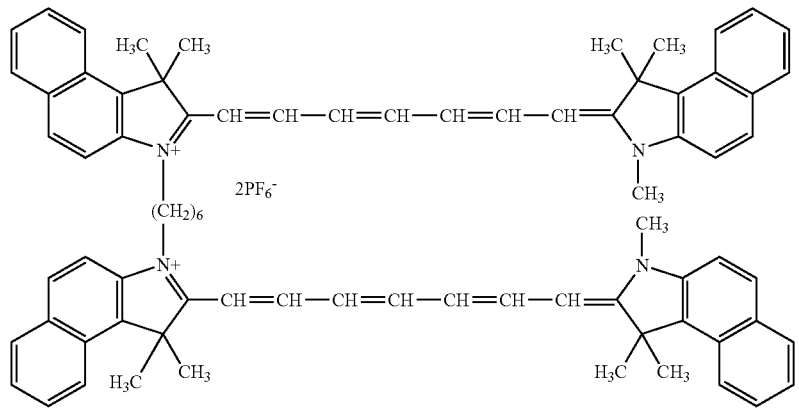

0.65 g of the compound represented by Chemical Formula 26 in a crystal form was sampled and dissolved in an adequate amount of a mixture of acetonitrile and chloroform, while 0.70 g of the compound represented by Chemical Formula 27 was dissolved in a fresh preparation of the same mixture, after which each solution was separately filtered, mixed and allowed to react at 60° C. for 15 minutes while stirring. The solvent in the reaction mixture was removed by distillation, and the remainder was recrystallized in ethanol to obtain 0.81 g of the cyanine dye represented by Chemical Formula 1 according to this invention in a blue crystal form.

Chemical Formula 27:

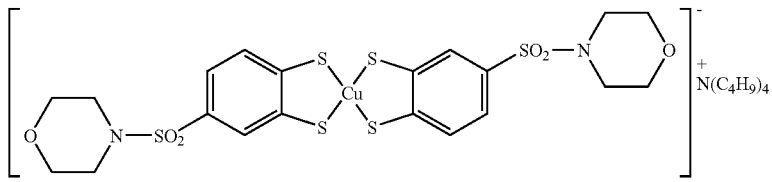

A part of the crystal was sampled and determined for decomposition point in usual manner, revealing that the decomposition point of the cyanine dye in this Example was 231° C. Further, upon determining visible absorption spectrum in methylene chloride in usual manner, the cyanine dye in this Example showed an absorption maximum ($\epsilon=4.59\times 10^5$) at a wavelength around 801 nm.

The cyanine dye in this Example, which efficiently absorbs near infrared radiation, is useful as light absorbing organic material which absorbs near infrared radiation so as to shield it or to convert it into energy in a variety of fields of, for example, information storage, information display, solar power generation, electric machinery apparatus, electric communication apparatus, optical apparatus, cloth, building/bedding/decorating product, sanitary and health product and agricultural material.

EXAMPLE 2

Cyanine Dye

The compounds represented by Chemical Formulae 28 and 29 in place of the compounds represented by Chemical Formulae 24 and 25, respectively, were allowed to react similarly as in Example 1 to obtain the compound represented by Chemical Formula 30 in a purple crystal form.

Chemical Formula 28:

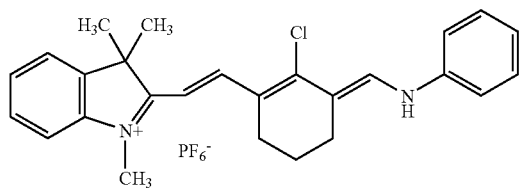

Chemical Formula 29:

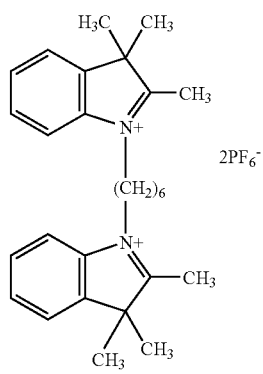

Chemical Formula 30:

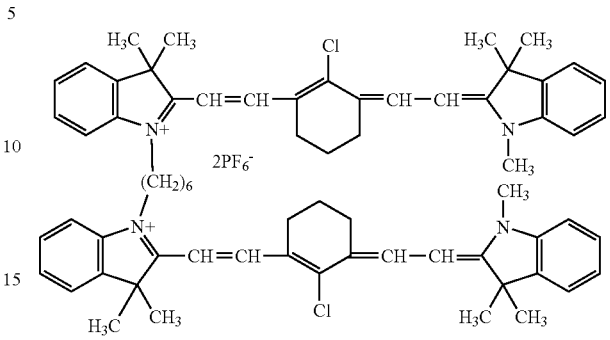

The compound represented by Chemical Formula 30 in place of the compound represented by Chemical Formula 26 was allowed to react similarly as in Example 1 to obtain the cyanine dye represented by Chemical Formula 2 in a green crystal form, according to this invention.

A part of the crystal was sampled and determined for decomposition point in usual manner, revealing that the decomposition point of the cyanine dye in this Example was 238° C. Further, upon determining visible absorption spectrum in methylene chloride in usual manner, the cyanine dye in this Example showed an absorption maximum ($\epsilon=3.50\times 10^5$) at a wavelength around 796 nm. The optical transmittance spectrum for the cyanine dye in this Example in a thin membrane form is given in FIG. 1. The spectrum in FIG. 1 shows that the cyanine dye in this Example bears an absorption maximum at a wavelength around 800 nm in the near infrared region and efficiently absorbs near infrared radiation.

The cyanine dye of this Example, which efficiently absorbs near infrared radiation, is useful as light absorbing organic material which absorbs near infrared radiation so as to shield it or to convert it into energy in a variety of fields of, for example, information storage, information display, solar power generation, electric machinery apparatus, electric communication apparatus, optical apparatus, cloth, building/bedding/decorating product, sanitary and health product and agricultural material.

EXAMPLE 3

Cyanine Dye

Twenty milliliters of acetonitrile was placed in a reaction vessel, admixed with 5.0 g of the compound represented by Chemical Formula 25, 2.2 g of the compound represented by Chemical Formula 31, one milliliter of acetic anhydride and 1.3 ml of triethylamine, and allowed to react at 48 to 50° C. for 36 minutes while stirring, after which the reaction mixture was admixed with methanol while cooling. The resultant crystals were dissolved in a mixture of methanol and chloroform and admixed with ammonium hexafluorophosphate in methanol while stirring, thus obtaining the compound represented by Chemical Formula 32 in a sparkling brown crystal form.

Chemical Formula 31:

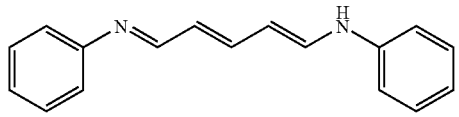

Chemical Formula 32:

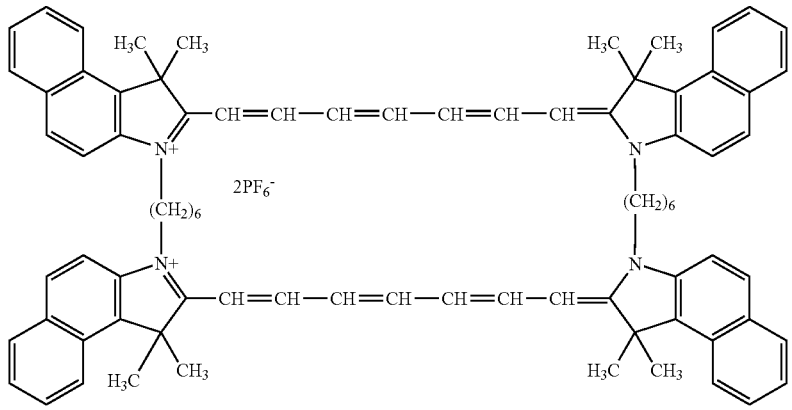

The compound represented by Chemical Formula 32 in place of the compound represented by Chemical Formula 26 was allowed to react similarly as in Example 1 to obtain the cyanine dye represented by Chemical Formula 10 in a dark green crystal form according to this invention.

A part of the crystal was sampled and determined for decomposition point in usual manner, revealing that the decomposition point of the cyanine dye in this Example was 255° C. Further, upon determining visible absorption spectrum in methylene chloride in usual manner, the cyanine dye in this Example showed an absorption maximum ($\epsilon$=3.01× $10^5$) at a wavelength around 801 nm.

The cyanine dye in this Example, which efficiently absorbs near infrared radiation, is useful as light absorbing organic material to absorb near infrared radiation so as to shield it or to convert it into energy in a variety of fields of, for example, information storage, information display, solar power generation, electric machinery apparatus, electric communication apparatus, optical apparatus, cloth, building/bedding/decorating product, sanitary and health product and agricultural material.

EXAMPLE 4

Cyanine Dye

The compound represented by Chemical Formula 29 and the compound in hydrochloride salt form represented by Chemical Formula 33 in place of the compounds represented by Chemical Formulae 25 and 31, respectively, were allowed to react similarly as in Example 3 to obtain the compound represented by Chemical Formula 34 in a sparkling brown crystal form.

Chemical Formula 33:

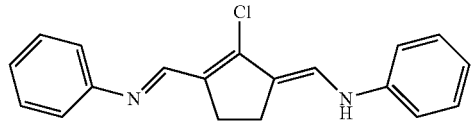

Chemical Formula 34:

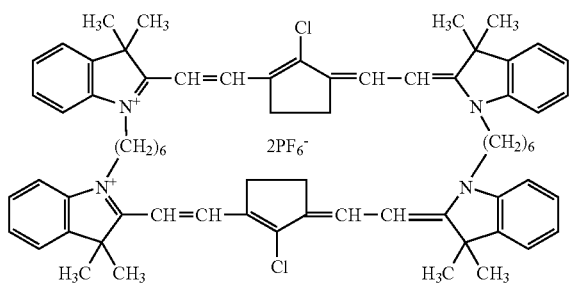

The compound represented by Chemical Formula 34 in place of the compound represented by Chemical Formula 26 was then allowed to react similarly as in Example 1 to obtain the compound represented by Chemical Formula 11 in a dark green crystal form according to this invention.

A part of the crystal was sampled and determined for decomposition point in usual manner, revealing that the decomposition point of the cyanine dye in this Example was 248° C. Further, upon determining visual absorption spectrum in methylene chloride in usual manner, the cyanine dye in this Example showed an absorption maximum ($\epsilon$=2.48× $10^5$) at a wavelength around 816 nm.

The cyanine dye in this Example, which efficiently absorbs near infrared radiation, is useful as light absorbing organic material to absorb near infrared radiation so as to shield it or to convert it into energy in a variety of fields of, for example, information storage, information display, solar power generation, electric machinery apparatus, electric communication apparatus, optical apparatus, cloth, building/bedding/decorating product, sanitary and health product and agricultural material.

Although starting conditions and yields are slightly different for respective cyanine dyes, the cyanine dyes of this invention, including those represented by Chemical Formulae 1 to 23 but not specifically illustrated in the above described Examples, can be obtained in a desired amount by either method in Example 1 to 4 or according thereto. The cyanine dyes in Examples 1 through 4 exhibit a solubility in solvents (0.5 g or more in 100 g solvent at 25° C.), such as amides, ketones, nitrites and halides which are usually used in the fields of information storage, information display and solar power generation, with no practical obstacle.

Experiment

Optical Resistance of Cyanine Dye

To 20 parts by mass of polymethylmethacrylate (average molecular weight of 15,000 daltons) were added 100 parts by mass of methyl ethyl ketone and either of the cyanine dyes represented by Chemical Formulae 2 and 11 according to this invention to give a concentration of 0.6% by mass, followed by ultrasonically dissolving them. After filtration, the solution was homogeneously casted on one side of an acrylic plate by means of spin coating method and dried by ventilation of air, after which the thin membrane of cyanine dye was immediately determined for optical transmittance at a wavelength of 780 nm using spectrophotometer.

Subsequently, laser was irradiated for 200 hours at a constant strength of 5 mW/cm$^2$ on the thin membrane with cyanine dye while placing a commercially available near infrared semiconductor laser equipment, Trade name of "Model LDU33-780-6", a product of SIGMA KOKI Co., LTD., oscillation wavelength of 780 nm, 10 cm away from the acrylic plate, after which the thin membrane was immediately determined for absorbance at a wavelength of 780 nm similarly as above. Thereafter, the percentage (%) of an absorbance determined immediately after laser irradiation against that determined immediately before laser irradiation was calculated and used as merkmal for optical resistance of cyanine dye. In parallel, analogous compounds represented by Chemical Formulae 30, 35 and 36 were determined for optical resistance similarly as above. The results were as shown in Table 1.

TABLE 1

| Cyanine dye | Residual dye rate (%) | Remarks |
| --- | --- | --- |
| Chemical Formula 2 | 91.3 | Present invention |
| Chemical Formula 11 | 90.2 | Present invention |
| Chemical Formula 35 | 62.5 | Control |
| Chemical Formula 30 | 30.2 | Control |
| Chemical Formula 36 | 28.7 | Control |

TABLE 1-continued

| Cyanine dye | Residual dye rate (%) | Remarks |
| --- | --- | --- |

Chemical Formula 35:

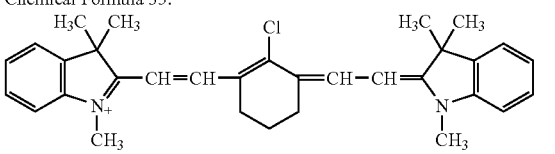

Chemical Formula 36:

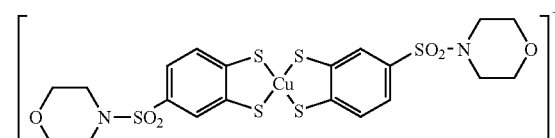

As seen from the results in Table 1, in an analogous compound represented by Chemical Formula 36 which bore within the same molecule one cyanine dye skeleton, and another analogous compound represented by Chemical Formula 30 which bore two cyanine dye skeletons, their residual dye rates were around 30% because they bore hexafluorophosphate ion as counter ion. An additional analogous compound represented by Chemical Formula 35, which bore within the same molecule one cyanine dye skeleton, marked a much higher residual dye rate (62%) in comparison with those represented by Chemical Formulae 30 and 36 because it bore an anion of organometallic complex as counter ion: The rate was however still not proved to be sufficient in practical uses. While each cyanine dye of this invention represented by Chemical Formulae 2 and 11, which bore within the same molecule two cyanine dye skeletons and also an anion of organometallic complex as counter ion, marked an extremely high residual dye rate (higher than 90%) when subjected to laser irradiation similarly as above, revealing that these cyanine dyes were substantially not decomposed under such conditions.

These experimental results demonstrate that optical resistance of cyanine dyes, which have been deemed to be poor in optical resistance in the near infrared region, can be remarkably improved by allowing a divalent group to couple a plurality of cyanine dye skeletons each other and providing as counter ion an anion of organometallic complex.

INDUSTRIAL APPLICABILITY

This invention is based on the creation of an entirely novel cyanine dye which has been never documented in literatures. Since the cyanine dye of this invention substantially absorbs light at a wavelength longer than 700 nm, in particular, near infrared radiation, and exhibits a large optical resistance against ambient light such as artificial or natural light in the near infrared region and also in a variety of organic solvents a solubility which arises no practical obstacles, it is very useful as light absorbing organic material to absorb near infrared radiation so as to shield it or to convert it into energy in a variety of fields of, for example, information storage, information display, solar power generation, electric machinery apparatus, electric communication apparatus, optical apparatus, cloth, building/bedding/decorating product, sanitary and health product and agricultural material.

The invention claimed is:

1. A cyanine dye represented by General Formula 2:

General Formula 2

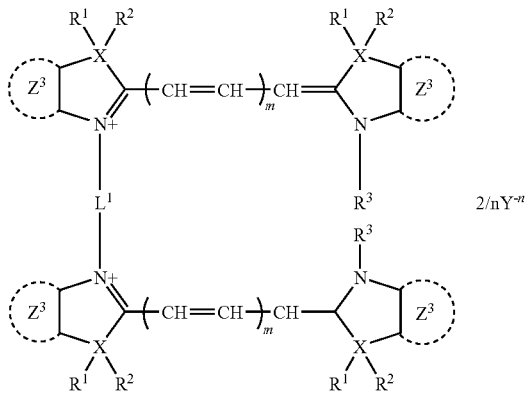

wherein in General Formula 2, X denotes a carbon atom or heteroatom of the group 15 or 16 in the periodic table excluding a nitrogen atom; $Z^3$ denotes either a benzene or naphthalene ring, while $R^1$ to $R^3$ independently denote a hydrogen atom or aliphatic hydrocarbon group, with the proviso that $R^1$ and/or $R^2$ are not present when X is a heteroatom; $L^1$ denotes a divalent group; the symbol "m" is an integer of 2 or larger; Y denotes a monovalent or multivalent anion of organometallic complex selected from the group consisting of azo, thiocatechol chelate, thiobisphenolate chelate, bisdithioi-α-diketone, and bisphenyldithiols; the symbol "n" is the number of charge unit in the anion of said organometallic complex; and the polymethine chain in the cyanine skeleton may bear a substituent and/or cyclic structure, said substituent being a member selected from the group consisting of an aliphatic hydrocarbon group, alicyclic hydrocarbon group, aromatic hydrocarbon group, halogen group, amino group, heterocyclic group, and combinations thereof; and said cyclic structure being a member selected from the group consisting of cyclopentene, cyclopentadiene, cyclohexene, cyclohexadiene, cycloheptene, cyclooctene, cyclooctadiene, and benzene, each of which may have a substitutent similar to those in the polymethine chain.

2. The cyanine dye as claimed in claim 1, which is not substantially decomposed when irradiated with 5 mW/cm² laser for 200 hours at a wavelength of 780 nm.

* * * * *

UNITED STATES PATENT AND TRADEMARK OFFICE
CERTIFICATE OF CORRECTION

PATENT NO. : 7,632,945 B2
APPLICATION NO. : 10/565592
DATED : December 15, 2009
INVENTOR(S) : Shinpo et al.

It is certified that error appears in the above-identified patent and that said Letters Patent is hereby corrected as shown below:

Column 42, lines 8-9, delete "bisdithioi-α-diketone" and insert --bisdithiol-α-diketone.--

Signed and Sealed this

Sixth Day of July, 2010

David J. Kappos
*Director of the United States Patent and Trademark Office*